June 24, 1941. E. T. PARSONS 2,246,949
DOUGH-PIECE SHAPING MACHINE
Filed June 25, 1940 3 Sheets-Sheet 3
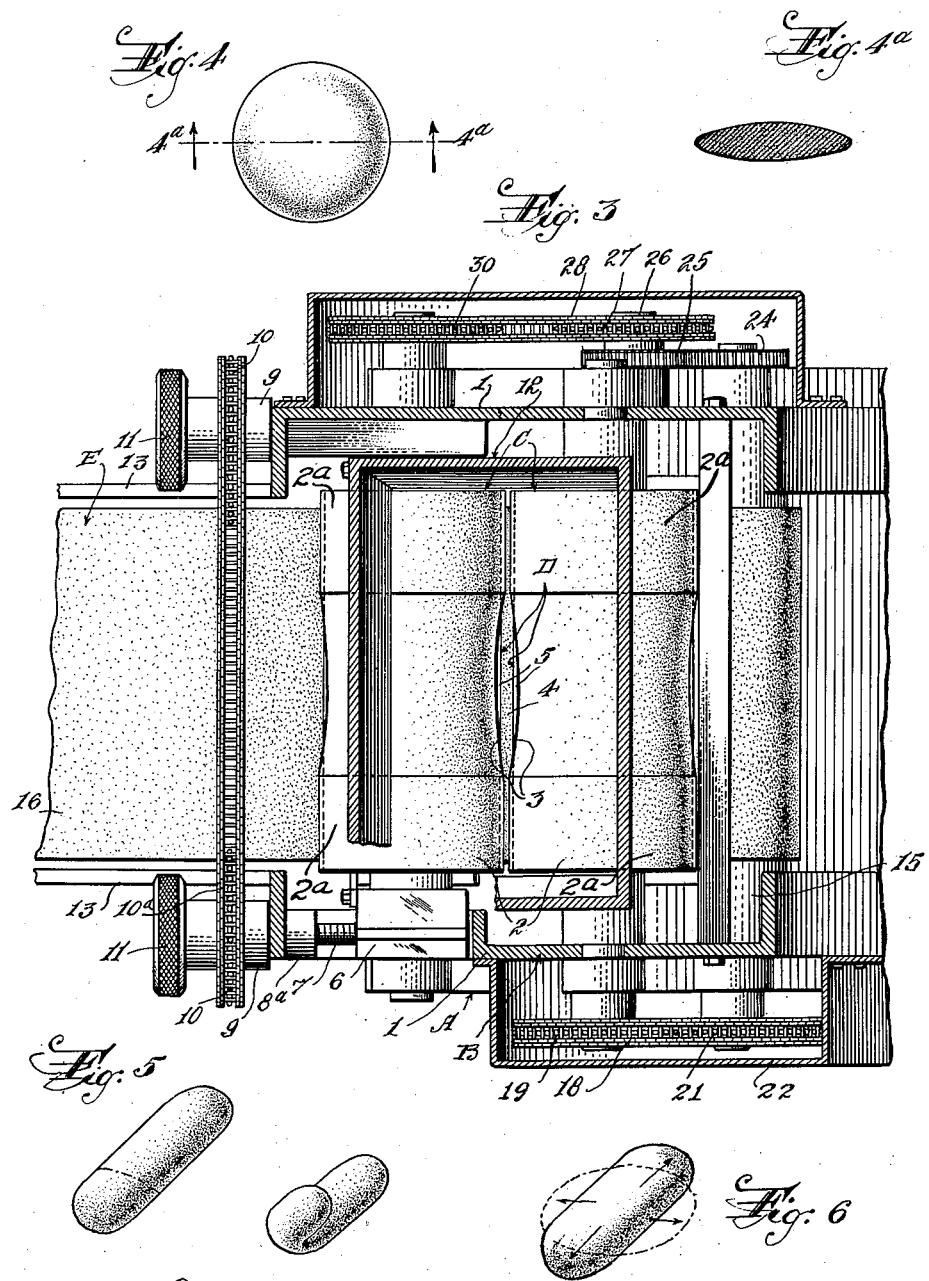

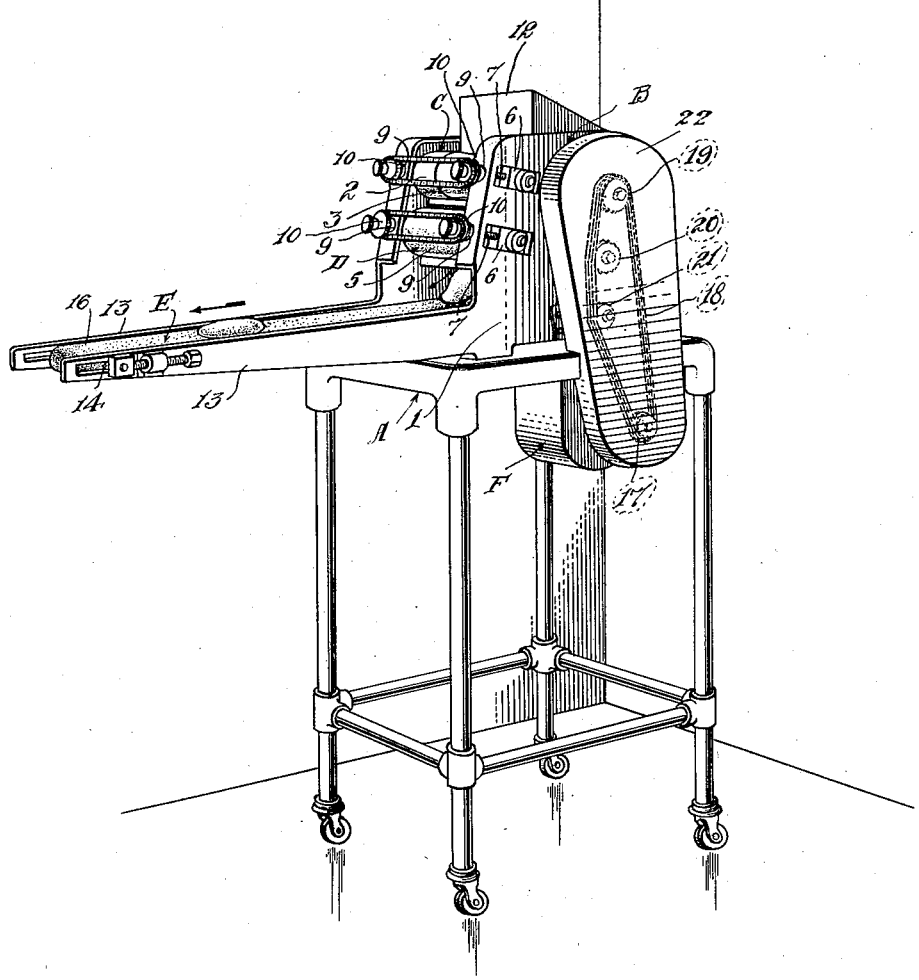

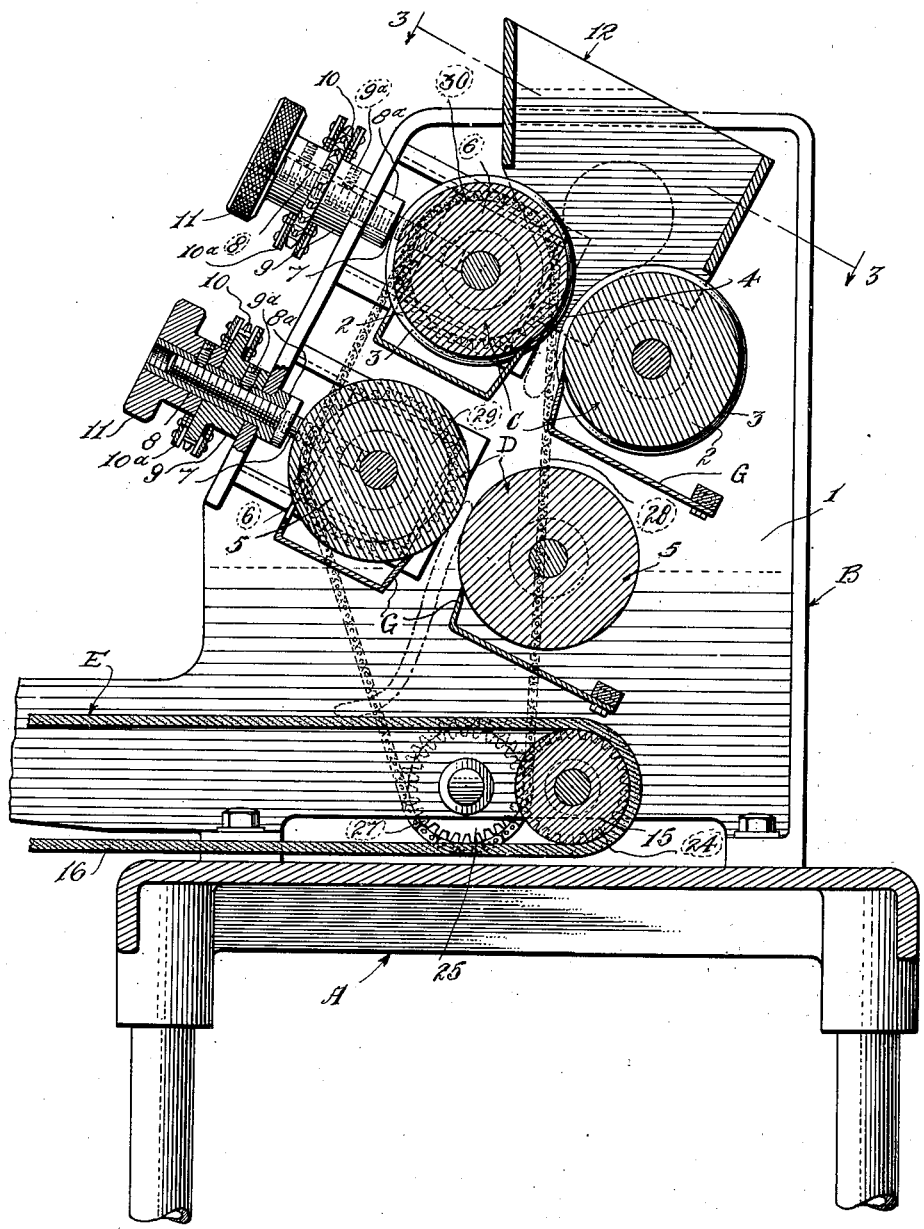

Patented June 24, 1941

2,246,949

UNITED STATES PATENT OFFICE 2,246,949

DOUGH-PIECE SHAPING MACHINE

Edward T. Parsons, Upper Montclair, N. J., assignor to Thomson Machine Company, Belleville, N. J., a corporation of New Jersey Application June 25, 1940, Serial No. 342,225

3 Claims. (Cl. 107—9)

This invention relates particularly to a dough moulding machine for shaping lumps or balls of dough into various forms to be baked for producing rolls. According to present baking practice, rolls are made in many different shapes, for example circular in plan and oval in cross-section, ovoid, elongated with oval cross section, and folded, for example, the Parker House roll. While machines have been made for partially shaping lumps of dough into the desired completed form, considerable manual manipulation and shaping of the dough pieces supplementary to the machine mouding, has been necessary, with consequent relatively high cost and slow production. My invention contemplates the elimination or reduction of the manual manipulation of the dough pieces by machine operations, with consequent reduction in cost and step-up in production.

One object of the invention is to provide a novel and improved machine of this character which shall be constructed to elongate or stretch a piece of dough successively longitudinally and transversely of the piece or in angularly disposed directions.

Other objects are to provide a novel and improved method of shaping dough-pieces for production of rolls and the like to reduce cost of and step up production, and to provide such a machine which shall include novel and improved means for first forming a lump or ball of dough into an elongated piece of oval cross-section and applying pressure to the piece along transverse zones thereof progressively longitudinally of the piece to partially flatten or stretch the piece transversely or laterally of itself.

Further objects are to provide in a machine of this character, a novel and improved construction, combination and arrangement of two pairs of driven rollers, one pair being formed to shape a lump of dough into an elongated piece of oval cross-section, and the other pair of rollers being arranged to receive said piece from the first-mentioned pair and partially flatten or stretch the piece laterally or transversely.

Other objects are to provide a novel and improved combination of such pairs of rollers with a conveyor for receiving and conveying the shaped piece of dough from the rollers to, for example, a panning station; and to obtain other advantages and results as will be brought out by the following description when read in conjunction with the accompanying drawings in which Figure 1 is a perspective view of a dough shaping machine embodying my invention.

Figure 2 is an enlarged fragmentary vertical longitudinal sectional view through the machine.

Figure 3 is a top plan view of the machine as shown in Figure 2, taken from the plane 3—3 of Figure 2.

Figure 4 is a plan view of one piece of dough shaped by the machine.

Figure 4a is a transverse sectional view of the piece shown in Figure 4.

Figure 5 is a perspective view of another piece of dough shaped preliminarily to forming a Parker House roll.

Figure 5a is a perspective view of the piece completely shaped to form a Parker House roll, and Figure 6 is a schematic perspective view of a piece of dough illustrating the successive shaping or stretching operations.

For the purpose of illustrating the principles of the invention, I have shown it embodied in one type of machine, although it should be understood that this is primarily for the purpose of explaining the now preferred embodiment of the invention. As shown, the machine includes a convenient table or stand A on which the frame B of the dough-shaping mechanism is mounted. This mechanism comprises two main side frame pieces 1 between and in which are journaled two pairs C and D of dough moulding rollers. One pair of rollers C is mounted in superposed relation to the other pair D, and each roller 2 of the pair of rollers C has approximately cylindrical end portions 2a spaced from the corresponding portions of the other roller. Also, each roller 2 has a circumferential shallow concave surface 3 between and merging into said cylindrical end portions and in juxtaposition to the corresponding concave surface of the other roller 2 so as to form an approximately elliptical or oval opening or space 4 between the two rollers. The ends of said oval opening or space 4 open into the space between said cylindrical portions of the rollers, and the major axis of said space is several times greater in length than the minor axis of said space.

The rollers 5 of the pair of rollers D are cylindrical, i. e., their peripheries are substantially straight from end to end and are spaced apart a distance less than the length of said minor axis of the oval space or opening 4 and greater than the distance between the concave surfaces of the rollers at the ends of said oval space. Preferably the rollers 5 are offset vertically from the corresponding rollers 2 as clearly shown in Figure 2, so that a piece of dough emerging from between the rollers 2 will fall by gravity against the periphery of one of the rollers 5 and be carried thereby between the two rollers 5.

Preferably one roller of each pair C and D is adjustable toward and from the other roller of the corresponding pair to vary the space between the rollers. For this purpose, I have shown each end of one roller of each pair journaled in a bearing block 6 slidable in the corresponding frame piece 1 and having a screw-threaded rod 7 fixedly connected thereto, upon which is a sleeve-nut 8 that is rotatable in the corresponding frame piece and held against longitudinal movement by a head 8ª on the sleeve and a collar 9 secured on the sleeve by a set screw 9ª. The sleeve-nuts 8 at each end of the roller are preferably connected for simultaneous operation as by sprockets 10 on the collars 9 connected by a chain 10ª. A knob 11 is fixedly connected to one of the sleeve-nuts 8 for manually rotating the sleeve-nuts.

Above the rollers 2, on the frame pieces 1, is mounted a suitable hopper 12 to receive lumps or balls of dough.

Beneath the pair of rollers D is a conveyor E for conveying the formed pieces of dough away from the rollers, for example to a panning station or any other desired point. This conveyor comprises side frame pieces 13 that may be secured to or project horizontally integrally from the frame pieces 1, and rollers 14 and 15 that are journaled in the frame and have an endless belt 16 of canvas or the like movable thereover.

The rollers 2 and 5 and the conveyor E are driven by any suitable mechanism, although it is desirable that the conveyor belt be driven at a linear speed equal to the peripheral speed of the rollers. As shown, an electric motor F is mounted on the under side of the table A and connected through suitable speed reducing gearing to a sprocket 17 around which passes a chain 18 which also passes over a sprocket 19 on the extended end of the shaft of one of the upper rollers 2, around a sprocket 20 on the shaft of the corresponding lower roller 3 and around a sprocket 21 on an extension of a shaft of the roller 8 of the conveyor. This chain and sprocket mechanism may be conveniently mounted at one end of the machine and enclosed in a gear case 22. At the other end of the machine the shaft 23 of the rollers 8 of the conveyor carries a gear 24 that meshes with a gear 25 mounted on a stub shaft 26 and rigidly connected to another sprocket 27 over which passes a chain 28 that also runs over a sprocket 29 on the shaft of the other roller of the lower pair D and over a sprocket 30 on the shaft of the corresponding roller of the upper pair C. With this construction, all of the rollers 2 and 5 will be driven at the same peripheral speeds, and the conveyor belt 16 will travel linearly at the same speed.

In operation of the machine, a lump or ball of dough of a size to form a roll or bun, designated by dot and dash lines in Figure 2, is dropped into the hopper 12 and is carried by rotation of the rollers 2 through the space 4 between the rollers and there elongated and shaped into approximately oval cross-section as shown by solid lines in Figure 6. The piece of dough then passes between the rollers 5 with its minor axis perpendicular to the axes of the cylindrical surfaces of said rollers and is stretched or flattened progressively longitudinally of the piece along zones transverse thereof, or laterally or transversely, into approximately the shape shown by dot and dash lines in Figure 6, whereupon the piece is deposited on the conveyor belt 16. It will be noted that as shown by dot and dash lines in Figure 2, the forward end of the piece of dough contacts with the conveyor before the rear end of the piece leaves the rollers 5. Due to the equality of speed of travel of the conveyor belt and the peripheries of the rollers 5, the piece will be picked up by the belt without stretching, compressing or other distortion of the piece.

By proper adjustment of the spaces between the rollers and proper relationship of the space between the rollers 2 to the space between the rollers 5, lumps or balls of dough may be shaped into a large number of different forms, for example as shown in Figures 4, 4ª and 5. Where the piece is elongate and oval in cross-section as in Figure 5, one end of the piece may be folded or returned upon the other end as in Figure 5ª to complete a form for baking of Parker House rolls.

It will be observed that during operation of the machine, the dough is stretched in two directions in approximately a continuous operation so that the desired uniform texture of the dough throughout the piece can be obtained, which is not possible where the piece is partially shaped by machine, then laid aside or thereafter pressed or manipulated by hand. The machine being capable of producing pieces of dough completely shaped ready for baking, without the necessity for manual shaping operations, makes it possible to produce roll forms at a much higher rate than has been possible heretofore.

It will be understood that the shape of the rollers and other details of structure of the machine may be modified and changed without departing from the spirit or scope of the invention, and other parts or attachments may be added, such as scrapers G that are utilized to prevent sticking of the dough to the rollers.

Having thus described my invention, what I claim is:

1. A machine of the character described for shaping dough into rolls or buns, comprising a first mechanism including two relatively movable members each having a shallow concave surface to cooperate with and in spaced relation and complemental to the concave surface of the other to form an approximately oval space between them to receive a lump of dough of a size to form a roll, the ends of said space being open and the major axis of said space being several times greater in length than its minor axis, means for actuating said members to cause relative movement of said surfaces for pressing and stretching said lump of dough between them to form an elongate piece of oval cross-section, a second mechanism including two relatively movable members having opposed straight parallel surfaces spaced apart a distance less than the length of said minor axis of said oval space between the members of said first mechanism and greater than the distance between said concave surfaces at the ends of said oval space to receive said piece between them from said first mechanism with the minor axis of said piece approximately perpendicular to said parallel surfaces, and means for actuating said members of the second mechanism to cause relative movement of said parallel surfaces and press and transversely stretch said pieces of dough into a shape approximately oval in cross-section in all planes transverse of said piece.

2. A machine of the character described comprising a first mechanism including two rotatable rollers arranged in opposed relation to each other and each having a circumferential shallow concave surface to cooperate with and in spaced relation and complemental to the corresponding surface of the other roller to form an approximately oval space between them for rolling and stretching a lump of dough between said surfaces to form an elongate piece of oval cross-section, the ends of said space being open and the major axis of said space being several times greater in length than its minor axis, a second mechanism including two rotatable rollers beneath the first-mentioned rollers, each roller having a cylindrical peripheral surface to cooperate with the cylindrical peripheral surface of the other roller to receive between them said piece from the first-mentioned rollers with the minor axis of said piece approximately perpendicular to the axes of said cylindrical surfaces, the rollers of said second mechanism being spaced apart a distance less than the length of said minor axis and greater than the distance between said concave surfaces at the ends of said oval space, said second mechanism being adapted to roll and transversely stretch said piece into a shape approximately circular in plan and oval in cross-section in all planes transverse of the piece, and means for driving the rollers of said first and second mechanisms.

3. A machine of the character described comprising a first mechanism including two rotatable rollers arranged in opposed relation to each other and each having approximately cylindrical end portions spaced from the corresponding portions of the other roller, each roller also having a shallow circumferential concave surface intermediate said end portions and merging into said cylindrical portions of the corresponding roller complemental to and to cooperate with the corresponding concave surface of the other roller to form an approximately oval space for rolling and stretching a lump of dough between said surfaces to form an elongate piece of oval cross-section, the ends of said oval space opening into the spaces between said cylindrical portions and the major axis of said space being several times greater in length than its minor axis, a second mechanism including two rotatable rollers beneath the first-mentioned rollers each having a cylindrical peripheral surface to cooperate with the cylindrical peripheral surface of the other roller to receive between them said piece from the first-mentioned rollers with the minor axis of said piece approximately perpendicular to the axes of said cylindrical surfaces, the rollers of said second mechanism being spaced apart a distance less than the length of said minor axis and greater than the distance between the opposed cylindrical portions of said rollers of the first mechanism, said second mechanism being adapted to roll and transversely stretch the piece into a shape approximately circular in plan and oval in cross-section in all planes transverse of the piece, and means for driving the rollers of said first and second mechanisms.

EDWARD T. PARSONS.